Figure 1:
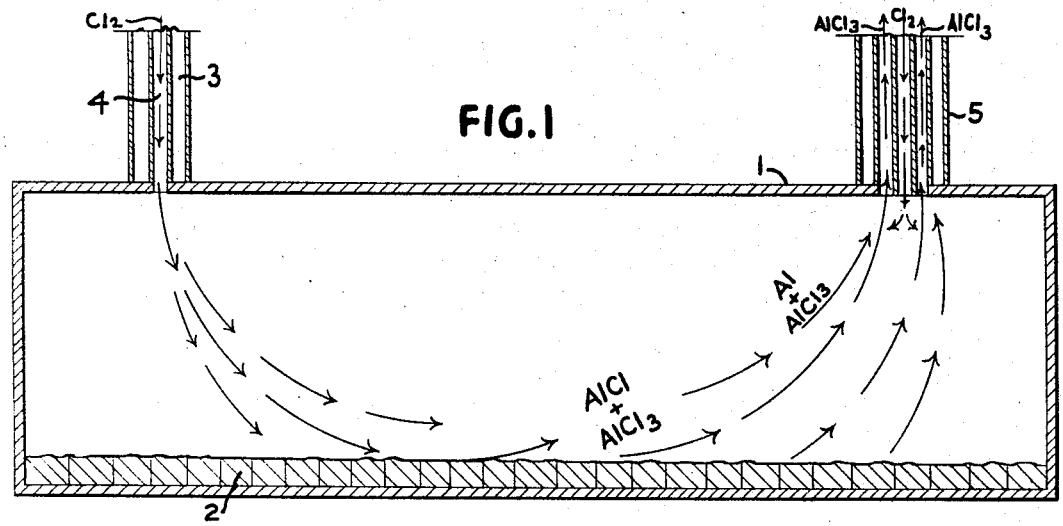

INVENTOR.
DOUGLAS H. EISENLOHR
BY Oscar L. Spencer
ATTORNEY

Sept. 26, 1967   D. H. EISENLOHR   3,343,911
PRODUCTION OF ALUMINUM TRICHLORIDE
Filed Feb. 20, 1964   2 Sheets-Sheet 2

INVENTOR.
DOUGLAS H. EISENLOHR
BY Oscar L Spencer
ATTORNEY

United States Patent Office 3,343,911
Patented Sept. 26, 1967

3,343,911
PRODUCTION OF ALUMINUM TRICHLORIDE
Douglas H. Eisenlohr, Barberton, Ohio, assignor to Pittsburgh Plate Glass Company, Pittsburgh, Pa., a corporation of Pennsylvania
Filed Feb. 20, 1964, Ser. No. 346,174
9 Claims. (Cl. 23—93)

This invention relates to novel apparatus and process for the production of metal halides. More specifically, the invention pertains to novel apparatus and process for the production of metal halides at a continuous and constant rate.

The present invention will be primarily described in connection with its utility for the production of aluminum trichloride for use in the production of titanium dioxide. While the description of the invention is primarily in terms of this preferred embodiment, it is to be understood that the scope of the invention is not so limited.

In the process for the production of pigmentary titanium dioxide by the vapor phase oxidation of titanium tetrahalide, aluminum trichloride is introduced as a nucleating agent and a rutile promoter. According to the present invention, aluminum trichloride can be produced at a continuous and controlled rate for use in the $TiO_2$ vapor phase oxidation process, by reacting chlorine and aluminum in an initial reaction zone and then adding chlorine to the product at a point removed from and remote from the initial and primary reaction zone.

When the aluminum and chlorine are initially reacted in the primary reaction zone, an aluminum chloride product comprising aluminum trichloride and aluminum monochloride is produced. As the product mixture cools, the aluminum monochloride decomposes to give metallic aluminum soot and aluminum trichloride. Likewise, there may already be present metallic aluminum inherently entrained in the product mixture stream. The metallic aluminum soot or fumes tend to precipitate out of the stream when contacted with a cool surface resulting thereby in the plugging of the generator or product lines leading from the generator.

Accordingly, it becomes difficult if not impossible, to use such a process in conjunction with a pigmentary $TiO_2$ vapor phase oxidation process wherein aluminum trichloride is required at a constant, continuous, uniform, and controlled rate. In this invention, it is proposed to overcome this problem by adding a secondary amount of chlorine to the stream containing the metallic aluminum at a point remote from the initial reaction zone. Although the chlorine is preferably introduced in an amount sufficient to convert the unreacted aluminum fumes to aluminum trichloride, the chlorine can be added in excess, in which case the aluminum trichloride and the excess chlorine may be jointly introduced directly into the pigmentary $TiO_2$ process, the chlorine having no adverse effect on the production of pigmentary titanium dioxide.

The invention will be better understood by first considering several of the methods by which aluminum chloride can be generated.

One such method is the molten aluminum process. The generation of aluminum chloride from molten aluminum usually involves two unit operations: First, the melting of the aluminum ingot and controlling the temperature of the melt; and second, the addition of the chlorine to the melt; and controlling the rate of chlorine addition. The heating of the aluminum can be done by any means conventional in the art such as electrical furnaces, gas furnaces, etc. Since pure aluminum solidifies at 1220° F. it takes temperatures of 1300 to 1400° F. to obtain rapid complete melt. The melting point of the aluminum melt can be lowered by the addition of silicon to the melt. About 13 percent by weight of silicon reduces the freezing point of aluminum melt to 1070° F. If the alloy is made richer in silicon, free silicon floats on top of the melt.

To remove occluded gas and the entrained solids from the melt, the chlorine gas may be introduced to the aluminum through a graphite tube which extends well below the surface of the melt near the bottom of the holding crucible or reactor generator. This is referred to as chlorine gas fluxing. The addition of the chlorine gas generates aluminum chloride vapor that disintegrates aluminum oxide to a light, non-melting mass that floats on top of the melt. Impurities at the same time sink to the bottom and remain until the crucible or reactor is emptied at the end of the run. Due to high temperatures, the aluminum chloride will be in a gaseous state and may be discharged at or near the top of the reaction zone. This molten aluminum process has several disadvantages. For example, it cannot be operated at high pressures because of the graphite tubes. Furthermore, it is costly to heat the aluminum initially to a molten state and it cannot be operated at temperatures below 600° F. since in this range aluminum chloride attacks graphite.

Another method which may be employed is the chlorination of the aluminum in a molten zinc alloy. Molten zinc containing 10 percent aluminum is chlorinated by bubbling chlorine gas into the molten metal alloy mixture at approximately 860° F. The chlorine is introduced through a small quartz tube surrounded with the larger quartz tube, the larger tube being partially filled with aluminum chips. This process also has obvious disadvantages in that the zinc alloy must be initially heated to a molten state although the process does have the advantage of lower operating temperatures than the molten aluminum process. Also the disposal of the waste zinc alloy with impurities may be a problem.

A preferred method for the making or generating of aluminum chloride is by the reaction of chlorine with solid state aluminum. The heat of reaction of chlorine with aluminum is almost as high as the heat due to oxidation. Based on aluminum, the heat evolved is approximately 10,000 B.t.u. per pound of aluminum. This is about the same amount of heat as is evolved from one pound of carbon and pure oxygen. One pound of aluminum requires approximately four pounds of chlorine or about 20 cubic feet of chlorine at S.T.P.

In this preferred solid state aluminum process, both the aluminum and chlorine are preheated to a temperature of 400° F. slightly above the freezing point of aluminum trichloride. The aluminum ingots should be approximately 99.9 percent pure.

The reaction of the chlorine and aluminum is highly exothermic, and accordingly, surplus heat is generated which should be removed. If the reaction takes place in a large enough reaction vessel or generator, heat may be dissipated rapidly by means of radiation. Similar results can be obtained in a small open vessel. Artificial means for dissipating the evolved heat may also be employed. Preferably, the vessel is jacketed with coils through which is circulated a liquid heat transfer media such as diphenyl oxide, isometric terphenyl mixture, or ortho-dichlorobenzene, all sold under the tradename Dowtherm. These serve a double function in preheating and maintaining the aluminum charge at about 400° F. while simultaneously removing heat generated by the reaction.

In each of the preceding methods, including the preferred solid aluminum process, the aluminum chloride is generated in a gaseous state due to high temperature environment resulting from the large amount of heat evolved from the reaction of the chlorine and aluminum. The temperature in the immediate reaction zone will generally be above 1000° F., and even higher if the aluminum is initially in a molten state. It is difficult, if not impossible, to control the immediate temperature of this reaction zone even by means of the jacketing coils. At temperatures above 1000° F., a small percentage of aluminum monochloride (AlCl) will form in addition to the aluminum trichloride (AlCl₃). The higher the temperature, the more aluminum monochloride which will be formed. As the gaseous mixture of AlCl₃ and AlCl passes from the reaction zone of the generator, it is cooled by natural radiation or by artificial means to temperatures below 1000° F. At such temperatures below 1000° F. AlCl breaks down to form aluminum trichloride and colloidal aluminum fumes. The overall reaction in the reactor vessel may be represenated by the following unbalanced equations:

(1) $Al + Cl_2 \rightarrow AlCl_3 + AlCl + heat$
(2) $AlCl - heat \rightarrow AlCl_3 + Al$ Equation 1 represents the reaction that initially takes place at or near the bottom of the reactor vessel in the reaction zone whereas Equation 2 represents the subsequent reaction when the monochloride is cooled as it passes from the immediate reaction zone preferably toward the top of the vessel.

The colloidal aluminum fumes or soot formed by the decomposition of aluminum monochloride presents a serious threat to the operation of a continuous aluminum trichloride generation for use in a $TiO_2$ vapor phase oxidation process, since it will form a black carbon-like deposit or crust on contact with a cool surface. Thus, if the aluminum trichloride is being with drawn through a discharge line, the aluminum fumes or soot which are being carried with the aluminum trichloride will settle at the inlet or along the internal walls of the discharge conduit and eventually clog the line.

Regardless of which of the foregoing methods is employed, the aluminum plugging is a problem. Plugging is particularly disadvantageous in a system wherein aluminum trichloride is needed at a constant and controlled rate of feed in the production of pigmentary $TiO_2$ via vapor phase oxidation of titanium chloride.

The problem might be circumvented by maintaining the aluminum chloride generator and discharge conduit at a high temperature above 1000° F. Where the aluminum chloride is to be transported a significant distance (as may be the case with a $TiO_2$ process) this is less than ideal.

Addition of greater quantities of chlorine to the main reactor chamber where it can contact the aluminum serves to form more AlCl and consequently more aluminum dust. Furthermore, the reaction of more chlorine with aluminum in a given time evolves more heat of reaction and consequently a higher reaction zone temperature at which an even higher percentage of AlCl is produced.

According to this invention, this aluminum soot plugging can be circumvented by the addition of a secondary amount of chlorine in the aluminum trichloride discharge conduit line at a point removed and away from the main chlorine-aluminum reaction zone, preferably at the inlet to the discharge line. By reaction zone, it is meant the immediate area or zone wherein the AlCl₃ and AlCl are formed, generally near the bottom of the reactor or generator where the chlorine contacts the aluminum. This zone is substantially higher in temperature than the top of the reactor. As the aluminum trichloride and AlCl pass from the immediate reaction zone, the mixture is instantaneously cooled by natural radiation or artificial means to a temperature below about 1000° F. By the time the mixture reaches an appropriate point remote from the reaction zone, for example, the top of the reaction vessel where the aluminum trichloride discharge line would advisedly be located, the AlCl has decomposed to form metallic fumes or dust which are soot-like in nature. As the fumes encounter a cool surface, for example, the cool wall of a pipe or conduit, the aluminum sticks to the walls and builds up to a solid cake.

This secondary amount of chlorine is thus added in excess at a point remote from the reaction zone after the metallic-aluminum soot has formed near the inlet of the aluminum trichloride discharge line. The amount of chloride added is in excess to the amount of aluminum fumes and reacts with the aluminum to give aluminum trichloride. No AlCl is usually formed because the overall temperature is maintained below the temperature at which AlCl forms, that is, about 1000° F. The amount of aluminum dust present is small compared to the amount of secondary chlorine added. If the overall temperature should rise, the actual amount of AlCl formed would be in proportion to the amount of aluminum present and thereby minute. The secondary chlorine should be introduced at a temperature above 400° F. at 1 atm. pressure; otherwise AlCl₃ will freeze out and plug the discharge line at some point. The exact sublimation point of the AlCl₃ will be a function of the pressure in the generator. Reference is made to Kirk-Othmer Encyclopedia of Technology (Second Edition), vol. 2, page 19.

Although the metallic aluminum dust has been described with reference to the decomposition of AlCl, the invention is not intended to be limited to this theory and accordingly is intended to be used whenever metallic aluminum is present in the product regardless of its source, including Al picked up by and entrained in the product stream.

The invention will better be understood and more specific advantages will appear from the following detailed description of preferred embodiments of the invention shown in the accompanying drawing which forms a part of this specification.

FIGURE 1 is a cross-sectional side view of the aluminum chloride generator 1 wherein aluminum 2 is placed along the bottom in the form of either solid blocks or in a molten state separated from the metal vessel walls by a ceramic liner (not shown). A ceramic or other refractory liner is not generally required in a solid aluminum process. By way of illustration and not by way of limitation, the aluminum is shown in FIGURE 1 as being in the solid state. The aluminum may be introduced into the generator by any convenient means, for example, through a side port or door (not shown). If the process is to be operated at about 1 atm. pressure, then it is preferred that the aluminum be preheated to about 400° F. either before or after it is introduced into the generator to keep from forming cool spots which will cause AlCl₃ to freeze out. Thus, the generator should be provided with either external or internal means (not shown) for heating of the aluminum blocks to 400° F. or to a partial or molten state. Furthermore, such medium should also be capable of simultaneously cooling the upper portion of the generator by removing excess heat generated by the exothermic reaction. Such means for cooling will not be necessary where the generator is sufficiently large such that the radiation losses are great enough to cool the generator. Where a combination heating and cooling means is desired, it is preferred that the generator be jacketed with conventional plate coil through which is circulated a heat transfer media such as Dowtherm. Such a heating and cooling system is well known and conventional in the art.

The aluminum chloride generator 1 is provided with a primary chlorine inlet pipe 4 wherein chlorine is introduced into the generator for reaction with the aluminum. Surrounding the primary chlorine introduction tube or pipe 4 is concentric tube or pipe 3 through which is circulated a heat transfer media such as Dowtherm. It is to be understood, of course, that other heat transfer means may be employed and are within the scope of this invention. By way of illustration, but not by way of limitation, steam and/or electric heating coils and/or gas heaters could be employed as a means of indirect heating of the incoming chlorine.

Figure 2:
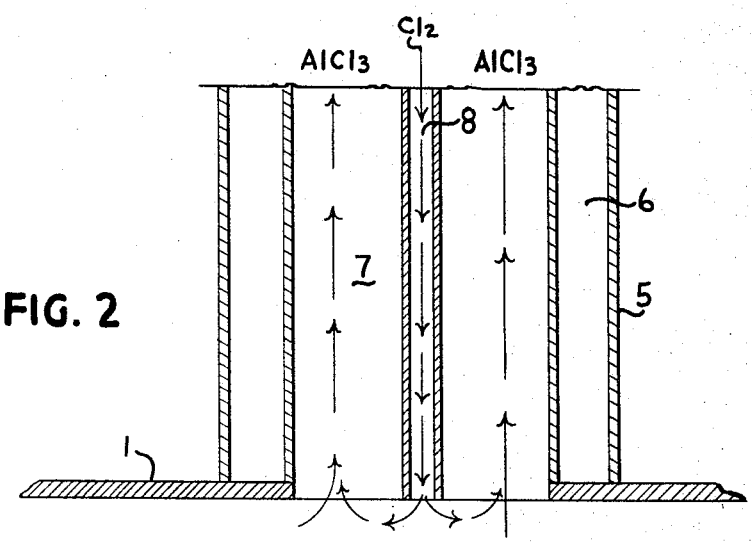

The aluminum trichloride and aluminum fumes, from the decomposition of the monochloride exit from the generator by way of novel secondary chlorine introduction means 5 which is shown more clearly in FIGURE 2. Although means 5 is shown at an end of the generator opposite the end at which the primary chlorine is introduced, it is within the skill of a mechanic in the art to position the means 5 at any reasonable point in the generator.

The secondary chlorine introduction means 5 is illustrated in FIGURE 2 which shows a tube or pipe 7 through which aluminum chloride is to exit from the generator. In the center of pipe 7 is a concentric pipe or tube 8 through which the secondary amount of chlorine is added, the secondary chlorine being introduced directly into the aluminum trichloride and aluminum fume stream as it approaches the inlet to pipe 7 at the top of the generator, such that the secondary chlorine reacts with the aluminum dust to form aluminum trichloride before the dust deposits in and plugs pipe 7. A pipe or tube 6 is also provided for the circulation of a heat transfer media in order to keep the aluminum trichloride exiting through pipe 7 above 400° F. In order to prevent cold spots and the freezing out of AlCl₃, the secondary chlorine should also be heated above 400° F. before it is introduced through pipe 8. The temperature of the aluminum trichloride may be maintained above 400° F. by any suitable means. By way of illustration and not by way of limitation, electric heating coil or high pressure steam might be employed. However, it has been found that a circulating heat transfer media such as employed in FIGURE 1 is preferred. Likewise, other equivalent heating means are well within the skill of an expert in the arts.

Figure 2A:
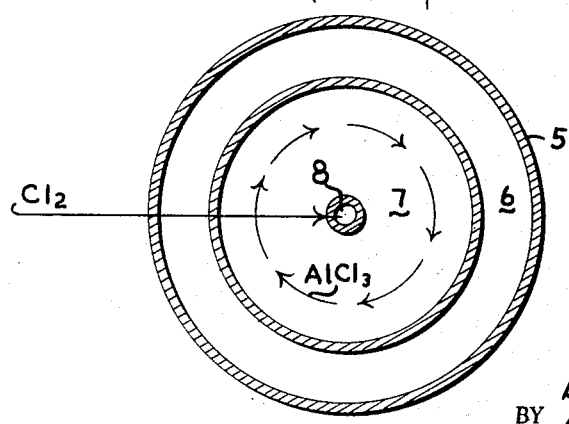

FIGURE 2A represents a cross-sectional view through the middle of FIGURE 2.

Figure 3:
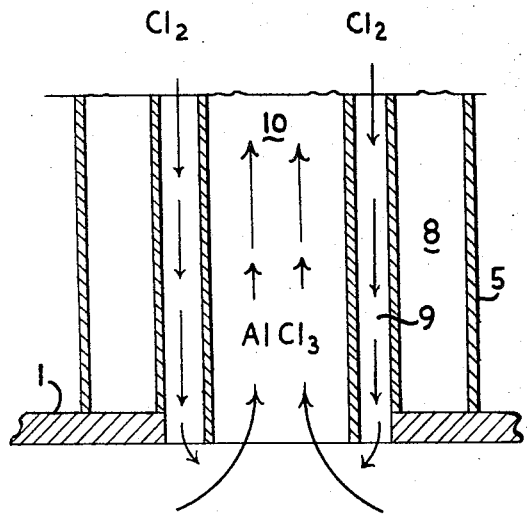

FIGURE 3 illustrates a modification of the secondary chlorine introduction means 5 illustrated in FIGURE 2. The aluminum trichloride exits through a pipe 10 which is surrounded by an exterior concentric pipe 9 through which the secondary chlorine is introduced. Again, the secondary chlorine passes into the aluminum chloride generator and merges with the exit stream of aluminum trichloride and aluminum fumes. A further concentric pipe is provided for the circulating of a heat transfer media the same as described in FIGURE 2.

Figure 4:
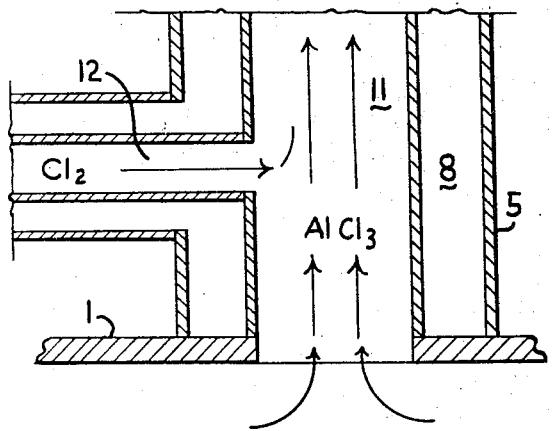

FIGURE 4 represents a further modification of the means by which secondary chlorine can be introduced. The aluminum trichloride and aluminum dust exit from the generator through pipe 11 and the secondary chlorine is introduced directly into pipe 11 from pipe 12. Again a circulating liquid heating media can be passed through concentric pipe same as in FIGURE 2.

FIGURES 2, 3, and 4 show merely by illustration and not by way of limitation, various ways by which the secondary chlorine may be added to the aluminum trichloride stream. It is to be understood that further modifications are within the scope of this invention.

Figure 5:
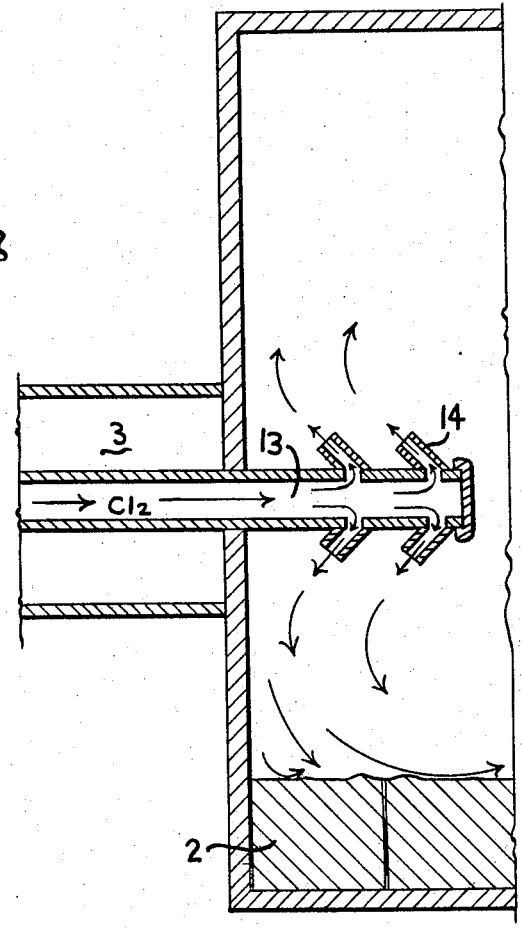

FIGURE 5 illustrates a further means of introducing primary chlorine to the aluminum chloride generator, the chlorine being introduced through a side or end pipe 13 provided with at least one nozzle 14. The primary chlorine is preheated by means of a circulating heat transfer media passing through tube 3 the same as described in FIGURE 1. It is also within the skill of an expert in the art to provide a similar type nozzle arrangement for the introduction of the secondary chlorine, for example, in combination with that of FIGURE 2. Likewise, it is within the skill of one in the art to employ other means of introducing the primary chlorine.

The following examples illustrate a manner in which this invention may be performed:

*Example I*

Aluminum chloride is generated via a solid aluminum process in a reactor as illustrated in FIGURE 1, the reactor shell being cylindrical and approximately 8 feet long by 15 inches in diameter by ¼ inch thick and constructed out of nickel. Panel coils are provided externally on the sides of the generator and on the aluminum charging door located at one end of the reactor for preheating of the aluminum blocks. A refractory lining is provided at the bottom of the generator as a safety precaution although the bottom of the generator rarely exceeds 400° F.

Secondary chlorine is added and aluminum trichloride removed using the apparatus of FIGURE 2 wherein the secondary chlorine inlet line is ½ inch nickel pipe and the aluminum trichloride discharge line is provided by the annulus between the chlorine inlet line and a 2-inch nickel pipe jacketed with a 3-inch steel pipe.

A heating media of Dowtherm is employed in the 3-inch jacketing at the primary chlorine inlet to the generator, the aluminum trichloride discharge, and also in the generator panel coils. Approximately 800 pounds of 99.9 percent pure aluminum charge is introduced to the generator in one or three pound ingots.

The aluminum charge is preheated to 400° F. and an elemental chlorine feed at 400° F. is introduced at a constant rate. Five pounds per hour of primary chlorine introduced to the reactor produces 6.25 pounds per hour of AlCl₃.

The reaction between the aluminum and chlorine is instantaneous and the resulting aluminum trichloride and metallic aluminum fumes are drawn off at the generator discharge line. Through a peephole, the presence of metallic aluminum can be physically observed at or near the point of the generator discharge line.

The pressure in the generator is maintained at approximately 1 atm. throughout the run. No secondary chlorine is added and the AlCl₃ discharge line plugs with metallic aluminum after about 2 hours.

*Example II*

The conditions of Example I are repeated except that two pounds per hour of secondary chlorine gas are added at the point of the aluminum chloride discharge line. The generator operates continuously for over 8 days (192 hours) without plugging.

This invention is highly advantageous in that it permits a continuous generation of aluminum chloride without plugging and thereby permits its passage at a continuous and constant rate to a pigmentary titanium oxide vapor phase oxidation process. The aluminum chloride product usually has to be purified by resublimation. However, in this invention, the product has only gaseous chlorine as an impurity which in many instances is a tolerable impurity of a titanium oxide vapor phase oxidation process.

Although this invention has been described in conjunction with the preferred solid aluminum process, it is to be understood that the secondary chlorine invention can be employed in combination with any process for chlorinating aluminum as well as those processes described herein including the chlorination of aluminum in the molten state.

Although elemental chlorine is the preferred ideal chlorinating agent, organic or inorganic compounds containing chlorine may be employed as a source of primary chlorine by the addition of such compounds directly to the aluminum chloride generator.

In the prior art, various organic and inorganic compounds are disclosed as nucleating additives and rutile promoters for a pigmentary TiO₂ vapor phase oxidation process. Thus, in U.S. Letters Patent 2,968,529, aromatic organic compounds are disclosed. Australian Patent 148,000 discloses aliphatic organic hydrocarbon compounds including hydrogen. Also see U.S. Patents 2,559,638 and 2,789,886.

According to an embodiment of the invention described herein, a chlorine compound, organic or inorganic, is employed which not only liberates chlorine for reaction (or serves as a chlorinating agent) with the aluminum but which will also provide a by-product additive for a pigmentary titanium oxide vapor phase oxidation process. Accordingly, if HCl is employed, the chlorine will react with the aluminum and the liberated hydrogen can be passed with the aluminum trichloride to the vapor phase oxidation process. The beneficial effects of hydrogen are disclosed and noted in the prior art cited above.

Other chlorinated compounds may be employed providing that such compounds give up CHl and/or chlorine for reaction with aluminum and providing further that such compounds give a by-product which is a beneficial additive to a metal or metalloid vapor phase oxidation process.

Any organic hydrocarbon, aromatic or aliphatic, may be employed. Generally speaking, the more chlorine which is on an organic chain or ring, the easier it is to remove. Likewise, the longer the chain or the greater the molecular weight of the ring, the easier it is to split off the chlorine or HCl. The splitting off of the chlorine or HCl is usually by way of a thermal breakdown of the compound. In lower temperature ranges of about 400° F., HCl is more likely to split off whereas at the higher temperature range of about 1000° F. free chlorine atoms or molecules are more likely to be split off.

In regard to the aliphatic hydrocarbons, any chlorinated methane, ethane, propane, butane, pentane, hexane, heptane, octane, monane, decane, hendecane, or subsequent homolog may be employed. As noted above, the longer the chain the easier it is to split off the chlorine. Accordingly, a $C_{12}$ hydrocarbon has been observed to give up very readily a single chlorine atom. Longer aliphatic hydrocarbon chains may be employed, the only limitation being one of economics.

Among the more common and economical of such chlorinated aliphatic hydrocarbons are methyl chloride, methyl dichloride, methyl trichloride, carbon tetrachloride, ethyl chloroethane, dichloroethane, tetrachloroethane, and hexachloroethane.

Likewise, various aromatic chlorinated hydrocarbons may be employed. For example but not by way of limitation, monochlorobenzene, dichlorobenzene, trichlorobenzene, tetrachlorobenzene, pentachlorobenzene, hexachlorobenzene. Likewise, the chlorinated toluenes with chlorine either on the benzene ring or on a side chain, for example, 2-chlorotoluene, 3-chlorotoluene, 4-chlorotoluene, 5-chlorotoluene, 6-chlorotoluene, benzyl chloride, benzylidene chloride.

Generally speaking, the aromatic hydrocarbons are less likely to split out HCl and are more likely to split off free chlorine.

Organic acids may also be employed, particularly the volatile ones, including by way of example and not by way of limitation, trichloroacetyl chloride and acetyl chloride.

It is also to be understood that the organic hydrocarbons, both aliphatic and aromatic may be subjected to a high thermal environment independent of the aluminum chloride generator. Accordingly, the chlorinated hydrocarbon may be subjected to thermal decomposition at a point remote from the metal chloride generator and free chlorine or HCl liberated therefrom. The chlorine or HCl can then be sent to the aluminum chloride generator as a source of primary and/or secondary chlorine and the by-products of the thermal liberation sent directly to the $TiO_2$ vapor phase oxidation process.

Although this invention is particularly involved with the production of aluminum chloride and has accordingly been described by reference to the details of such production, it may be employed in conjunction with other aluminum halide processes, particularly the production of a bromide and iodide. Likewise, other metal halides, for example, those of zinc, antimony, iron, lead, tin, and mercury may be produced pursuant thereto.

Although aluminum chloride generated by the process of this invention is particularly suited for and employed in conjunction with a titanium oxide vapor phase oxidation process, it may be employed for the production of nucleating and rutile promoters for other metal oxide vapor phase oxidation processes. The term metal as employed herein is also intended to include metal-like elements such as the metalloids. For example, and not by way of limitation, vapor phase oxidation processes for producing the oxides of aluminum, arsenic, barium, beryllium, boron, calcium, gadolinium, germanium, hafnium, lanthanum, lithium, magnesium, phosphorus, potassium, samarium, scandium, silicon, sodium, strontium, tantalum, tellurium, terbium, thorium, thulium, tin, titanium, ytterbium, yttrium, zinc, zirconium, niobium, gallium, and antimony. Salts and/or oxides of such metals may also be employed as nucleating agents.

Obviously, many modifications and variations of the present invention are possible in light of the above teachings.

Thus although this invention has been described with reference to particular apparatus, it is to be understood that the process invention is not limited to this apparatus. It is within the skill of one in the art to provide other means of adding secondary chlorine to the aluminum chloride stream in order to practice the novel process.

It is therefore to be understood that the invention is not to be limited as described above and the invention may be practiced otherwise within the scope of the appended claims.

I claim:

1. In a process of preparing aluminum trichloride substantially free of metallic aluminum from a chlorinating agent and metallic aluminum in a reaction zone, the improvement which comprises contacting metallic aluminum of at least 99.9 percent purity with a chlorinating agent in a reaction zone maintained at temperatures above 400° F.; removing a gaseous mixture of aluminum trichloride and aluminum monochloride from the principal zone of reaction, said gaseous mixture being at a temperature above 1000° F.; cooling said gaseous mixture until metallic aluminum forms therein; contacting said cooled mixture containing said metallic aluminum with additional chlorinating agent at a temperature above the sublimation temperature of aluminum trichloride but below 1000° F. whereby to provide a gaseous mixture substantially free of metallic aluminum; and removing substantially pure aluminum trichloride from said reaction zone.

2. The process of claim 1 wherein the chlorinating agent is selected from the group consisting of chlorine and hydrogen chloride.

3. The process of claim 1 wherein the chlorinating agent is selected from the group consisting of chlorinated aliphatic hydrocarbons and chlorinated aromatic hydrocarbons.

4. The process of claim 1 wherein the chlorinating agent is a $C_1$–$C_{12}$ chlorinated aliphatic hydrocarbon.

5. In a process of preparing aluminum trichloride substantially free of metallic aluminum from a chlorinating agent and metallic aluminum in a reaction zone, the improvement which comprises contacting metallic aluminum of at least 99.9 percent purity with chlorine in a reaction zone maintained at temperatures above 400° F.; removing a gaseous mixture of aluminum trichloride and aluminum monochloride from the principal zone of reaction at a temperature above 1000° F.; cooling said gaseous mixture to below 1000° F. so as to permit aluminum monochloride to disproportionate to metallic aluminum and aluminum trichloride; contacting said cooled mixture with additional chlorine at a temperature above 400° F. but below 1000° F. whereby to provide a gaseous mixture substantially free of metallic aluminum; and withdrawing substantially pure aluminum trichloride from said reaction zone.

6. In a process of preparing substantially pure aluminum trichloride from a chlorinating agent and aluminum metal in a reaction vessel, the improvement which comprises reacting aluminum metal of at least 99.9 percent purity with chlorine in a reaction zone maintained at temperatures above 400° F. to form a gaseous mixture of aluminum trichloride and aluminum monochloride, said gaseous mixture being above 1000° F.; cooling said mixture to below 1000° F. at a point remote from said principal zone of reaction but within the reaction vessel so as to allow the disproportionation of aluminum monochloride to additional aluminum trichloride and aluminum metal; reacting additional chloride with said cooled mixture at above the sublimation temperature of aluminum trichloride but below 1000° F. in an amount sufficient to convert said aluminum metal to aluminum trichloride; and removing substantially pure aluminum trichloride from said reaction vessel.

7. In a continuous process of preparing substantially pure aluminum trichloride by the reaction of a chlorinating agent and aluminum metal in a reaction zone, the improvement which comprises forming a gaseous mixture containing aluminum trichloride and aluminum monochloride having a temperature above 1000° F. by contacting aluminum metal with a chlorinating agent selected from the group consisting of chlorine and hydrogen chloride at a temperature above 400° F.; removing said gaseous mixture from the immediate reaction zone; cooling said mixture to a temeprature below 1000° F. but above the sublimation temperature of aluminum trichloride whereby the aluminum monochloride disproportionates to aluminum trichloride and aluminum dust; contacting said cooled mixture with at least a stoichiometric amount of additional chlorinating agent at a temperature below 1000° F. but above 400° F. so as to convert said aluminum dust to aluminum trichloride; and withdrawing substantially pure aluminum trichloride.

8. A process of preparing substantially pure aluminum trichloride, which comprises heating a chlorinating agent and aluminum metal to above 400° F.; contacting said aluminum metal with said chlorinating agent in a reaction zone; removing from the immediate reaction zone a gaseous product mixture comprising aluminum trichloride and aluminum monochloride, said product mixture having a temperature above 1000° F.; cooling said gaseous product mixture until said aluminum monochloride decomposes to aluminum trichloride and aluminum dust; contacting said cooled mixture with at least a stoichiometric amount of additional chlorinating agent, based on said aluminum dust, at a temperature below 1000° F. but above 400° F. whereby to provide a gaseous mixture substantially free of aluminum dust and withdrawing substantially pure aluminum trichloride from said reaction zone.

9. A process according to claim 8 wherein the chlorinating agent is selected from the group consisting of chlorine and hydrogen chloride.

References Cited

UNITED STATES PATENTS

| | | | |
|---|---|---|---|
| 1,165,065 | 12/1915 | Brooks | 23—93 |
| 2,385,505 | 9/1945 | Grimble | 23—93 |
| 2,542,194 | 2/1951 | Hannum | 23—281 |
| 2,705,186 | 3/1955 | Hardy et al. | 23—93 |
| 2,760,846 | 8/1956 | Richmond et al. | 23—202 |
| 2,937,082 | 5/1960 | Johnston et al. | |
| 2,946,668 | 7/1960 | Richelsen | 23—277 |
| 3,052,518 | 9/1962 | Frey | 23—93 |
| 3,069,281 | 12/1962 | Wilson | 106—300 |
| 3,078,148 | 2/1963 | Belknap et al. | 23—202 |
| 3,152,864 | 10/1964 | Derham | 23—93 |

OSCAR R. VERTIZ, *Primary Examiner.*

MAURICE A. BRINDISI, *Examiner.*

E. STERN, *Assistant Examiner.*